Dec. 19, 1967  S. K. HSU  3,359,045

SQUEEZE FILM BEARING

Filed May 20, 1966

INVENTOR
STEPHEN K. HSU

BY *James L. O'Brien*

ATTORNEY

United States Patent Office 3,359,045
Patented Dec. 19, 1967

3,359,045
SQUEEZE FILM BEARING
Stephen K. Hsu, Ann Arbor, Mich., assignor to The Bendix Corporation, a corporation of Delaware
Filed May 20, 1966, Ser. No. 551,589
5 Claims. (Cl. 308—1)

This invention relates generally to squeeze film bearings, namely, bearings in which at least one of two members that are moving relative to each other is made to vibrate at high frequency and low amplitude thereby creating a compressed gas film in a gap between the two members so that relative movement is practically friction free.

The invention described herein was made in the performance of work under a NASA contract and is subject to the provisions of Section 305 of the National Aeronautics and Space Act of 1958, Public Law 85–568 (72 Stat. 435; 42 U.S.C. 2457). U.S. Patent No. 3,171,696 discloses a bearing in which one of the two members that are moving relative to each other is made to vibrate at an ultrasonic frequency. Such bearings require for their successful operation, oscillation or vibration of at least one of two adjacent surfaces at a high frequency and low amplitude so that the gap between the two surfaces changes dynamically. This vibration or oscillation is obtained by forming one of the members, namely, the member in which strain is to be produced, of a piezo-electric or magnetostrictive material so that electrical energy can be used to produce the desired strain. One of the problems encountered in a bearing assembly of this type is the problem of mounting the strain producing member on the bearing base, which is the fixed component of the bearing. If the strain producing member is rigidly clamped to the base, its freedom to vibrate is restricted so that the symmetry and uniformity of the vibration will be poor, resulting in impaired bearing effectiveness. On the other hand, if the strain producing member is very loosely mounted on the base, the stiffness of the bearing and its ability to carry a load is impaired. This is due to the fact that small changes in load force will then cause large deflections of the moving part of the bearing with respect to the base. It is an object of this invention, therefore, to provide an improved bearing of squeeze film type in which the strain producing member forms an integral structural member in the bearing and its vibration is utilized to create a first gas film on which the rotatable part of the bearing rotates and a second gas film on which the strain producing member itself is supported on the base.

Another object of this invention is to provide an improved squeeze film bearing assembly in which thrust plates are connected to a tubular strain producing member so as to obtain a combination journal and thrust bearing, and in which the thrust plates are connected to the strain producing member so that the axial vibration of the strain producing member is transmitted to the thrust plates without the thrust plates exerting a clamping effect which would restrict the radial vibration of the strain producing member.

In the improved squeeze bearing assembly of this invention, the rotatable part of the bearing, sometimes referred to as the "float," is supported on a gas film disposed between the float outer surface and the inner surface of a tubular strain producing member. The strain producing member is in turn supported with respect to the base on a second gas film disposed between the outer surface of the strain producing member and the base. Both gas films are obtained as a consequence of vibration of the strain producing member at high frequency and low amplitude. As a result, the construction of the bearing assembly is simplified, requiring only three principal parts, namely, the float, the strain producing member with any attached thrust plates, and the base. The supporting forces on the strain producing member are distributed relatively uniformly and symmetrically over a large area of the strain producing member which is also advantageous. As a result, a favorable compromise is achieved between freedom of oscillation for the strain producing member and stiffness of the entire bearing. In addition, the attachment of the thrust plates to the strain producing member so as to minimize any clamping effect of the thrust plates on the vibratory movements of the strain producing member in a radial direction enables the use of the bearing of this invention as a combination journal and thrust bearing.

Further objects, features and advantages of this invention will become apparent from a consideration of the following description, the appended claims, and the accompanying drawing in which:

Figure 1:
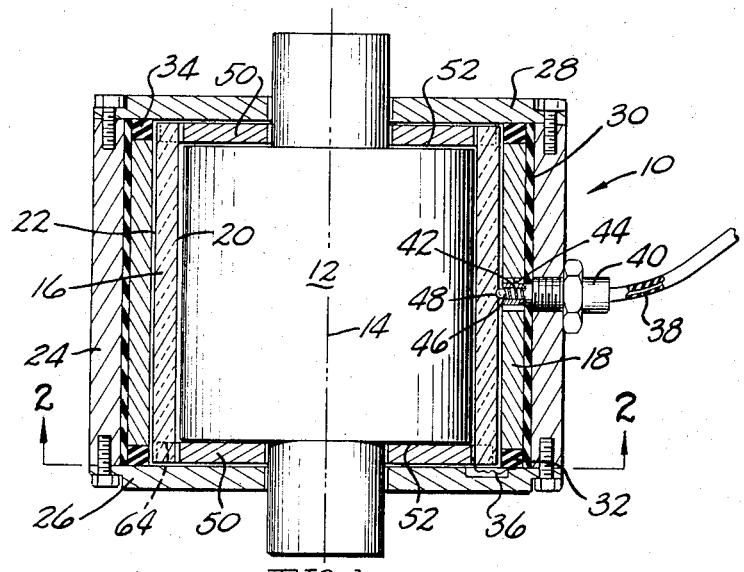
FIGURE 1 is a sectional view of the improved squeeze film bearing assembly of this invention.

With reference to the drawing, the bearing assembly of this invention, indicated generally at 10, is illustrated in FIG. 1 as consisting of a member 12 which is to be rotated about an axis 14, and is therefore referred to hereinafter as the "rotatable member" or "float," a tubular strain producing member 16 which is vibrated at high frequency and low amplitude, and a tubular base 18 which surrounds the strain producing member 16 and provides a support therefor. The strain producing member 16 can be a piezoelectric or magnetostrictive material, and in the illustrated form of the invention is a well known piezo-ceramic tube provided on its inner and outer surfaces with electrode coatings 20 and 22, respectively. To vibrate the tube 16 it is only necessary to have a difference in electrical potential across the electrode coatings 20 and 22, and if alternating-current electrical power is applied, preferably at a frequency corresponding to a structural natural frequency of the tube 16, the tube 16 will vibrate in both axial and radial directions at the ultrasonic driving frequency and at low amplitude.

The base 18 is supported in a tubular housing 24 on which annular end caps 26 and 28 are mounted so that the end caps form a part of the base. The base 18 is insulated from the housing 24 by a tubular insulation member 30 and from the end caps 26 and 28 by annular insulating rings 32 and 34, respectively. The housing 24 is at ground potential and is connected to the inner surface electrode coating 20 by a ground lead 36 to insure that the coating 20 will be at ground potential. It is desirable that the inner surface electrode coating 20 be at ground potential to avoid interference with the electrical drive circuit when the rotatable member 12 is in contact with the coating 20 during start-up from a quiescent condition.

An electrical conductor or "hot lead" 38 is provided for applying a voltage to the outer surface electrode 22. A fitting 40 mounts the insulated conductor 38 on the housing 24 so that it is insulated therefrom, and the fitting 40 carries a coil spring 42 connected to the conductor 38. The spring 42 is also insulated from the housing 24 and extends through a radial opening 44 in the base 18 so that it is spaced from the base 18. A metal ball 46 is seated on the terminal end of the coil spring 42 and projects into a complementary shaped cavity 48 in the electrode coating 22 on the radially outer surface of the strain producing member 16. As a results, the hot lead 38 is capable of applying a voltage to the electrode surface 22 and the seating of the ball 46 in the cavity 48 will create sufficient frictional force on the strain producing member 16 to prevent it from being rotated by the drag thereon during rotation of the rotatable member 12.

It can thus be seen that when a suitable alternating voltage is applied to the coating 22, by the conductor 38, the strain producing member 16 is vibrated in a radial direction at high frequency and low amplitude. The strain producing member 16 is also simultaneously vibrated in an axial direction, and this axial vibration is utilized in a manner hereinafter explained. The radial movement of the strain producing member 16 relative to the rotatable member 12 produces an intervening layer of compressed gas in the gap between the radially inner surface of the strain producing member 16 and the rotatable member 12. As a result, the rotatable member 12 is supported for rotation about the axis 14, which can be disposed in any plane, horizontal, vertical or in-between, on a practically frictionless layer of compressed gas (which can be air). Also, the vibration of the strain producing member 16 produces a second layer of compressed gas between the outer surface of the strain producing member 16 and the base 18. This layer of gas provides a support for the strain producing member 16 which offers relatively little restriction to the movement of the strain producing member 16 but provides for support of the strain producing member 16 relatively uniformly and symmetrically over its surface. Consequently, if the member 12 is caused to rotate, it will continue to rotate for an appreciable length of time.

Figure 2:
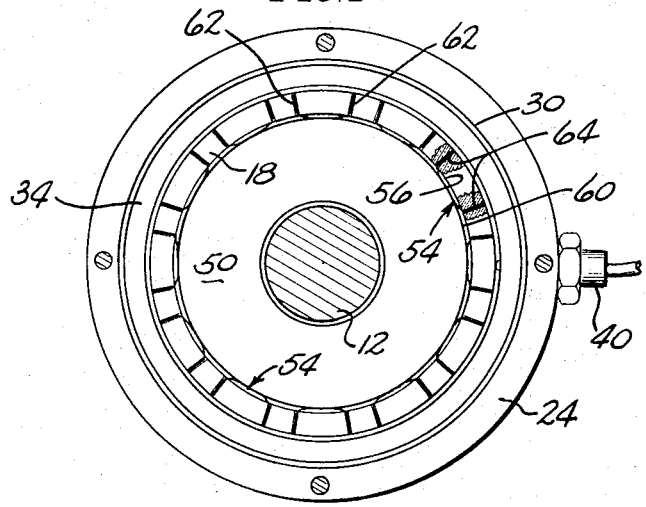
FIGURE 2 is a sectional view looking substantially along the line 2—2 in FIG. 1 of the bearing assembly of this invention.
Figure 3:
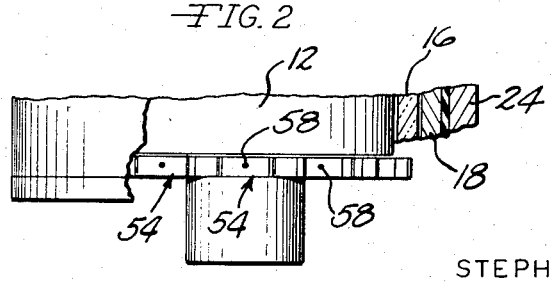
FIGURE 3 is an elevational view of one end portion of the bearing assembly of this invention, with some parts broken away and other parts shown in section for the purpose of clarity.

The bearing assembly 10 also functions as a thrust bearing in addition to its function described above as a journal bearing, since it includes a pair of thrust plates 50 which are mounted at opposite ends of the strain producing member 16 in a closely spaced relation with the end faces 52 of the rotatable member 12. As described in greater detail hereinafter, the thrust plates 50 are flexibility supported in a radial direction on the tube 16 and rigidly supported in an axial direction. The purpose of this mounting is to provide for the transmission of axial oscillation of tube 16 to thrust plates 50 with relatively little restriction to radial oscillation of tube 16 by the plates 50. In the illustrated embodiment of the invention, each thrust plate 50 is mounted on the strain producing member 16 by a plurality of generally U-shape flexible strips 54 shown in FIG. 2. Each strip 54 has a curved base 56 which is secured, such as by welding 58 (FIG. 3), substantially midway between its ends to the peripheral surface 60 of the thrust plate 50. Each strip 54 also includes a pair of legs 62 which extend in a direction radially away from the surface 60. As shown in FIG. 1, each thrust plate 50 is of a diameter to fit within one end of the strain producing tube 16. The legs 62 on the strips 54 extend into slots 64 (FIG. 2) in the ends of the tube 16 and are bonded therein so that they are spaced from the outer electrode coating 22. The lead 36 is connected conveniently to one of the strips 54, the strips 54 being engaged with the inner electrode coating 20.

The strips 54 provide for a flexible mounting of the thrust plates 50 on the strain producing tube 16 in a radial direction. In other words, the legs 62 of each strip 54 are readily movable toward and away from the thrust plate peripheral surface 60, with the base 56 flexing to take up this movement without transmitting the movement to the thrust plate 50. However, since the flexible strips 54 are substantially rigid in a direction axially of the strain producing tube 16, they function to transmit axial vibration of the tube 16 to the thrust plates 50 so that the thrust plates 50 will vibrate at the same high frequency and low amplitude as the strain producing tube 16 in a direction axially of the tube. This vibratory motion of the thrust plates 50 will produce compressed layers of gas between the inner surfaces of the thrust plates 50 and the rotatable member end faces 52 to thereby provide practically frictionless thrust support for the rotatable member 12. Likewise, the thrust plates 50 will in turn be supported on compressed layers of gas produced in the gaps between the thrust plates 50 and the inner or end faces of the housing end caps 26 and 28 as a consequence of vibration of the thrust plates 50.

From the above description, therefore, it is seen that this invention provides an improved squeeze film bearing assembly 10 in which the strain producing member 16 functions as an integral structural part of the bearing assembly. The rotatable member 12 is supported on a film of compressed gas and the strain producing member 16 is in turn supported on a second compressed film of gas. Consequently, the rotatable member 12 can rotate practically friction free. The bearing assembly 10 readily functions as both a journal and thrust bearing by virtue of the mounting of the thrust plates 50 on the strain producing member 16 so that radial vibration of the tube 16 is taken up by the flexible mounting strips 54.

It will be understood that the squeeze film bearing utilizing double film which is herein disclosed and described is presented for purposes of explanation and illustration and is not intended to indicate limits of the invention, the scope of which is defined by the following claims.

I claim:

1. A bearing assembly comprising a fixed hollow base having an inner surface, a tubular strain producing member located within and in a closely spaced relation with said base inner surface, a rotatable member disposed coaxially within said strain producing member in a closely spaced relation with the inner surface thereof, and means coupled to said strain producing member for vibrating it at high frequency and low amplitude in a radial direction to thereby provide a first gas film between said rotatable member and the inner surface of said strain producing member on which said rotatable member is supported and a second gas film between the strain producing member and said base inner surface on which said strain producing member is supported.

2. A bearing assembly according to claim 1 in which said rotatable member has end faces substantially perpendicular to the axis of said strain producing member, and in which said base has end faces substantially perpendicular to the axis of said strain producing member, thrust plates disposed in a closely spaced relation with said end faces, and means attaching said thrust plates to opposite ends of said strain producing member so that vibration of said strain producing member in axial directions is transmitted to said end plates whereby to produce additional gas films disposed between said end faces and said thrust plates, said attaching means being flexible in a direction radially of said strain producing member to take up the radial vibration of said strain producing member.

3. A bearing assembly according to claim 2 in which said attaching means consists of a plurality of generally U-shape flexible strips each of which is secured substantially midway between its ends to the periphery of one of said thrust plates, each said strip extending radially outwardly from the thrust plate to which it is secured and being secured at its ends to said strain producing member.

4. A bearing assembly according to claim 1 in which said transducer means includes an electric current conductor, coil spring means extended through a radial opening in said base in a spaced relation with said base and electrically connected to said conductor, and a metal ball seated on the end of said spring means and urged thereby into engagement with the radially outer surface of said strain producing member, said outer surface being formed with a cavity into which said ball projects.

5. A bearing assembly according to claim 2 in which said strain producing member is a piezoceramic tube having electrode coatings on the radially inner and outer surfaces thereof, and said bearing assembly further includes an electrically grounded housing supporting said base, conductor means connecting said thrust plates to said housing, means electrically connecting said thrust plates to said electrode coating on the inner surface of said strain producing member so that said thrust plates and said inner surface coating will be at ground potential, and electrical conductor means connected to the electrode coating on the outer surface of said strain producing member for creating a different electrical potential thereon.

References Cited

UNITED STATES PATENTS 3,304,132  2/1967  Broeze et al. _____ 308—1

MARTIN P. SCHWADRON, *Primary Examiner.*

F. SUSKO, *Assistant Examiner.*